(12) United States Patent
Daniel

(10) Patent No.: US 8,905,304 B1
(45) Date of Patent: Dec. 9, 2014

(54) SYSTEM AND METHOD FOR PROCESSING CERTIFIED OR REGISTERED MAIL

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 14/231,732

(22) Filed: Mar. 31, 2014

Related U.S. Application Data

(63) Continuation-in-part of application No. 14/207,251, filed on Mar. 12, 2014.

(60) Provisional application No. 61/806,643, filed on Mar. 29, 2013.

(51) Int. Cl.
*G06K 5/00* (2006.01)
*G06Q 20/10* (2012.01)

(52) U.S. Cl.
CPC ............... *G06Q 20/105* (2013.01); *G06K 5/00* (2013.01)
USPC ........................................................ 235/380

(58) Field of Classification Search
USPC ................... 235/375, 380, 492; 705/401, 407
See application file for complete search history.

(56) References Cited

U.S. PATENT DOCUMENTS

| | | | | |
|---|---|---|---|---|
| 4,901,241 A | * | 2/1990 | Schneck | 705/401 |
| 7,128,258 B1 | * | 10/2006 | Harper | 235/375 |
| 2005/0278263 A1 | * | 12/2005 | Hollander et al. | 705/402 |
| 2011/0047101 A1 | * | 2/2011 | Caudle | 705/407 |

* cited by examiner

*Primary Examiner* — Seung Lee
(74) *Attorney, Agent, or Firm* — Carol N. Green, Esq.

(57) ABSTRACT

The present disclosure relates generally to systems and methods related to mailing certified or registered mail and accessing payment systems using a secure system. Cardholder may use a mail card to authenticate his identity via a card reader, which includes biometric verification means for comparing cardholder's biometric sample with a biometric identifier stored thereon, upon authentication, cardholder can obtain access to the postal services computer via an application program that allows cardholder to provide self-authenticating contact information read from the mail card as well as input mail delivery information, e.g. addressee's mailing address, weight, perishables, etc., using the card reader's keyboard for generating the mailing label, and scheduling mail pickup. Mail card may also include payment information such that it can be used as tender for payment for the mail services as well as for any other payments, e.g. utility bills, where the mail card is accepted as legal tender.

28 Claims, 10 Drawing Sheets

SYSTEM AND METHOD FOR PROCESSING CERTIFIED OR REGISTERED MAIL

PRIORITY CLAIM

This patent application is a continuation-in-part of, and claims priority under 35 U.S.C. 119(e) to U.S. Provisional Patent Application No. 61/806,643 titled "System and Method for Sending Certified or Registered Mail" filed Mar. 29, 2013; U.S. Non-Provisional Continuation in Part patent application Ser. No. 14/207,251 titled "System And Method For Confirming Mail Delivery Using An Interactive Electronic Card" filed Mar. 12, 2014. The entire disclosures of the afore-mentioned patent applications are incorporated by reference as if fully stated herein.

FIELD OF THE INVENTION

The present disclosure relates generally to systems and methods related to mailing certified or registered mail and accessing payment systems using a secure system. Cardholder may use a mail card to authenticate his identity via a card reader, which includes biometric verification means for comparing cardholder's biometric sample with a biometric identifier stored thereon, upon authentication, cardholder can obtain access to the postal services computer via an application program that allows cardholder to provide self-authenticating contact information read from the mail card as well as input mail delivery information, e.g. addressee's mailing address, weight, perishables, etc., using the card reader's keyboard for generating the mailing label, and scheduling mail pickup. Mail card may also include payment information such that it can be used as tender for payment for the mail services as well as for any other payments, e.g. utility bills, where the mail card is accepted as legal tender.

BRIEF SUMMARY OF THE INVENTION

The present disclosure relates generally to electronic systems and methods, and more particularly, to system comprising of an electronic mail card with cardholder's information electronically stored thereon and including a coded frame, displayed on the electronic mail card's exterior, which includes at least one hot corner with at least one hyperlink or icon embedded within the coded frame, activated for display when image capturing means scans the coded frame and upon activation, the at least one hyperlink or icon may be engaged for controlling media content pursuant to a control command associated with the at least one icon or hyperlink in the at least one hot corner; biometric verification means positioned on a card reader, configured for receiving at least one biometric sample from the cardholder for validation with the at least one biometric identifier stored thereon; and the card reader in electronic communication with a computer processor, wherein the card reader is configured for activating the electronic mail card upon validation of the at least one biometric sample, and upon activation, the electronic mail card releases the at least one cardholder's information stored thereon to the card reader, which receives the at least one cardholder's information for generating addressee information for a mailing label, and payment information for charging for postage.

The card reader is configured for reading the identification information from the mail card for providing mail status updates to the cardholder and may include memory means for storing any one or more of the following: at least one biometric sample, at least one biometric identifier, identification information, customer account number, or other data structures. Data structures include but are not limited to: card number, security parameters, and cardholder's identification information. Media content includes any one or more of the following: videos, audio, text, graphics, cardholder's identification verification information, payment information, photographs, public service announcements, questions, games, promotions, coupons, coupon codes, bar codes, discounts, pricing, availability, advertisement, movies, and movie trailers. Payment information comprises customer account number, available balance and bank information.

System further comprises a networked communication device, e.g. a mobile device that comprises a computer processor that includes computer executable instructions executable by the computer processor and configured for launching a postage application program, programmed for controlling the media content; the image capturing means; displaying means for displaying the at least one media content; and input means for providing input for two-way communications with the postal service. The interactive postage application is further configured for publishing mail status updates in realtime; facilitating communications of an alert to the postal service; publicizing a public service announcement to a plurality of other card holders within a certain radius; for displaying the at least one media content with full functionality for review and control using control commands; and for retrieving the at least one media content by linking to a website via its web address where cardholder may do any one of the following: verify mail delivery status; search postage costs; issue instructions for redirecting mail delivery; manage a mailbox; provide the post office with instructions concerning his/her mail. The at least one control command for displaying the at least one media content includes but is not limited to any one or more of the following: play, stop, fast-forward, rewind, pause, maximize viewing, minimize, end and cancel.

A method comprises of receiving at least one biometric sample from a cardholder for validation via biometric verification means positioned on a card reader, which has at least one biometric identifier electronically stored thereon; validating the at least one biometric sample; activating an electronic mail card upon validation of the at least one biometric sample by the card reader that is in electronic communication with a computer processor, where the mail card has cardholder's information electronically stored thereon and comprises a coded frame displayed on the electronic mail card's exterior, which includes at least one hot corner with at least one hyperlink or icon embedded within the coded frame, activated for display when image capturing means scans the coded frame and upon activation, the at least one hyperlink or icon may be engaged for controlling media content pursuant to a control command associated with the at least one icon or hyperlink in the at least one hot corner; releasing the at least one cardholder's information stored thereon to the card reader upon activation, which receives the at least one cardholder's information; and generating addressee information for a mailing label, and payment information for charging for postage.

In some embodiments, method further comprises of using a networked communication device for scanning with the networked communication device image capturing means a coded frame or a coded image within a coded frame displayed on a mail card with identification information electronically stored thereon where the coded frame includes at least one hot corner with at least one hyperlink or icon embedded within; activating for display the activated at least one hyperlink or icon for the coded frame or a coded image within the coded frame; displaying the at least one media content on the networked communication device's displaying means; and receiving input via input means for two-way communications with the postal service.

Method further comprises the card reader reading the data structures from the mail card for providing mail status updates to the cardholder. Card reader includes memory means that may include any one or more of the following stored thereon: at least one biometric sample, at least one biometric identifier, identification information, customer account number, or other data structures. In some embodiments, method further comprises the postage application program publishing mail status updates in realtime; facilitating communications of an alert to the postal service; publicizing a public service announcement to a plurality of other card holders within a certain radius; displaying the at least one media content with full functionality for review and control, and retrieving the at least one media content by linking to a website via its web address where cardholder may do any one of the following: verify mail delivery status; search postage costs; issue instructions for redirecting mail delivery; manage a mailbox; provide the post office with instructions concerning his/her mail

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1A:
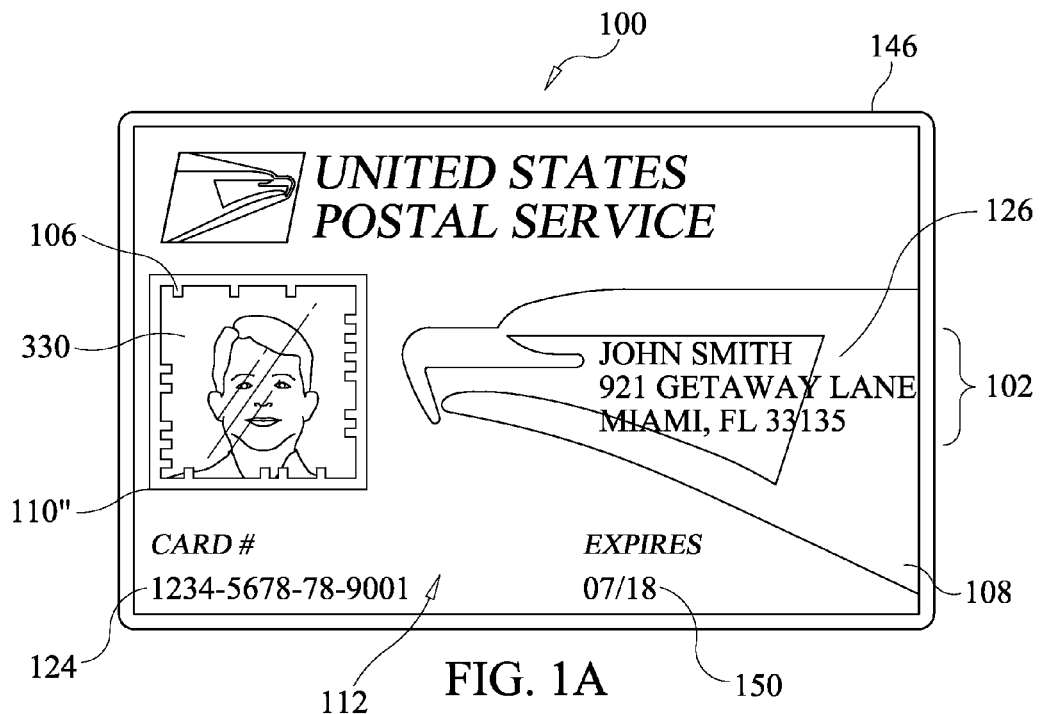
FIGS. 1A-1C are exemplary embodiments of the interactive mail card.

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Apparatus

Figure 1B:
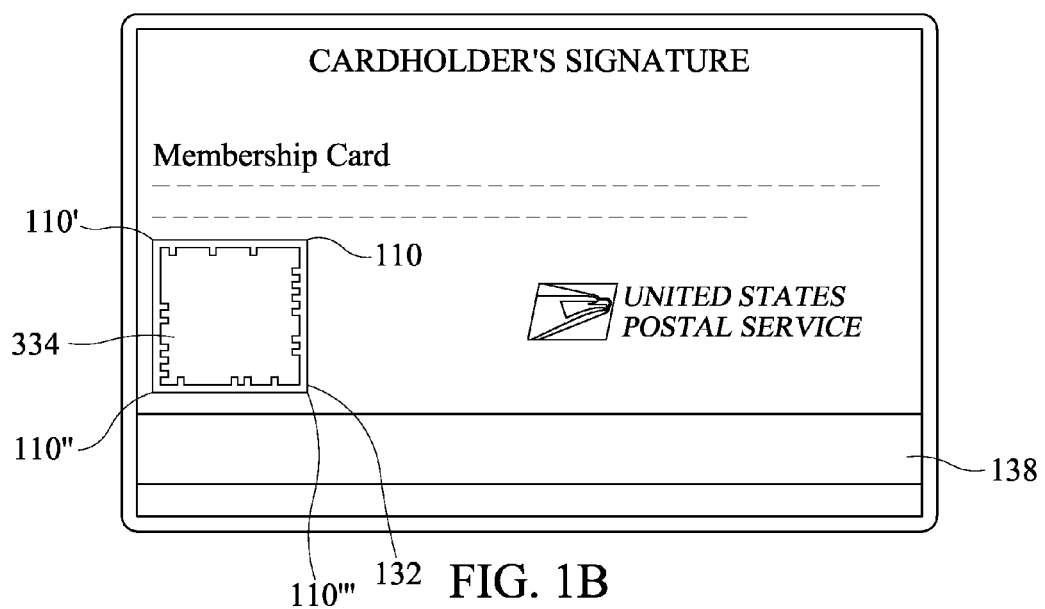
Figure 1C:
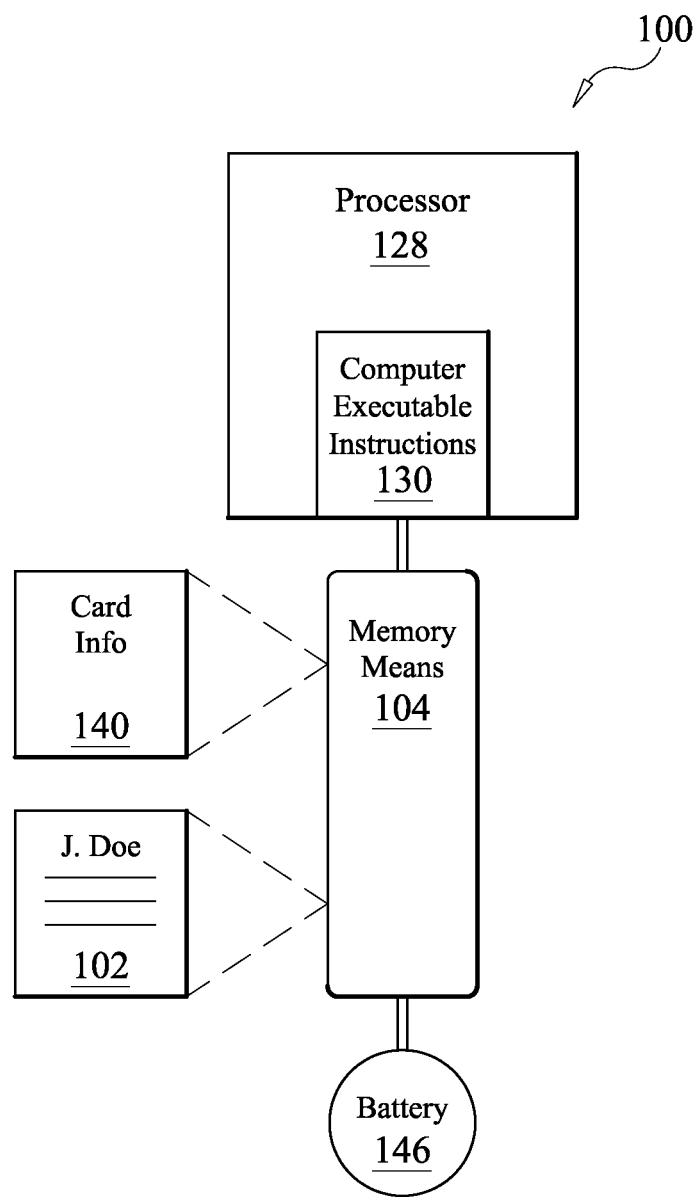
Figure 2:
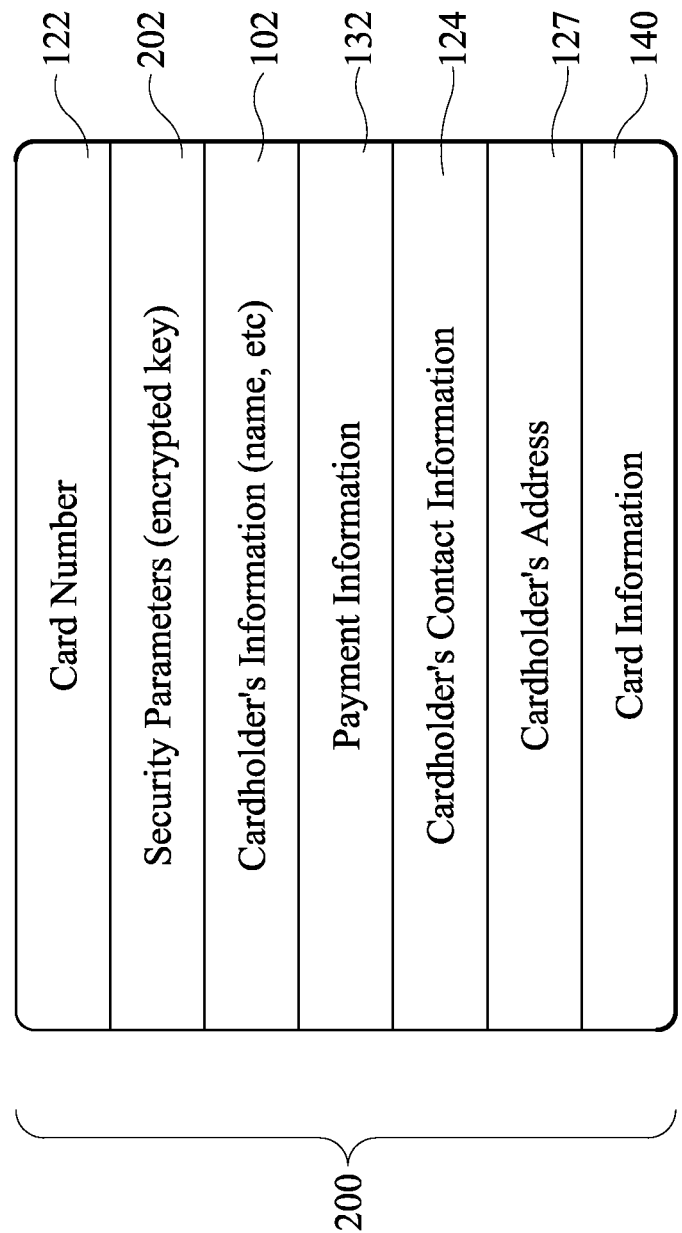
FIG. 2 is an exemplary embodiment of the data structures of the invention.

FIGS. 1A, 1B & 1C are exemplary embodiments of the apparatus 100 of the invention, i.e. an interactive mail card 100. Mail card 100, i.e. an electronic data card, is a functional component of the system of the invention and may be sized and dimensioned to match payment cards (gift, debit and/or credit cards) that are generally known and used in the arts. Mail card 100, i.e. an electronic data card, is configured for storing thereon cardholder's identification information 102, data structures 200 (as shown in FIG. 2) and the like. Mail card 100 is selected from the group of electronic devices consisting essentially of programmable smart cards, memory cards, and processor cards, with at least one memory means 104 embedded therein. The mail card 100 includes a coded frame 106 displayed on the card's exterior 108 (either front or back) where the coded frame 106 includes at least one hot corner 110 with at least one or more hyperlinks 112, 112' or icons 114, 114' embedded within the coded frame 106, activated for display when image capturing means 116 scans the coded frame 106 and upon activation, the at least one hyperlink 112 or icon 114 may be engaged for controlling media content 118 and two-way communications between cardholder and the postal service 120. Two-way communications include communications to and from the cardholder and the postal service 120 and may include text messages, video transmissions, voice communications and the like. Media content 118 may include but is not limited to any one or more of the following: videos, identification verification information, cardholder's identification information 102, mail status, mail request, photographs, questions, and public service announcements, that may be presented in audio, graphics, animation, text, videos or any other format. Card identification information 102 as used herein includes any one or more of the following: card number 122, cardholder's contact information 124 (e.g. name 126, address, date of birth, mobile number, cardholder's photograph, authenticating security question(s), cardholder's postal address 127, and/or billing address if different from cardholder's postal address 127, country of domicile, and the like, or any other information that the issuing postal service may deem significant enough to store on the mail card 100.

In some embodiments, mail card 100 may include a processor 128 positioned within. Processor 128 may be any type of processor 128, such as, but not limited to, a central processing unit (CPU), a microprocessor, a video processor, a front end processor, a coprocessor, a single-core processor, a multi-core processor, as well as any known processor 128 that is used in the arts to control the various hardware and software components of the mail card 100, e.g. the memory means 104.

As shown in FIG. 1C, in some embodiments, embedded within the processor 128 are computer executable instructions 130, readable and executable by the card's at least one processor 128 where the computer executable instructions 130 are operative to perform the varied system and methods disclosed herein including but not limited to: retrieving the cardholder's identification information 102 stored thereon when communicating with the card reader 142 upon activation of the mail card 100 when read for generating addressee information for a mailing label using cardholder's address 127, and payment information 132 for postage charges. Computer executable instructions 130 are further configured for tracking and publishing updates via an application program 134 so that when the coded frame 106 is scanned, the cardholder may either receive an updated status for the mail or the mail's status is automatically published with push notification to the network configured communication device 136; or retrieving media content 118 pursuant to a scanned coded frame 106 that includes at least one or more hot corners 110, 110', 110" with at least one embedded hyperlink 112 or icon 114 within, and the like.

Computer executable instructions 130 may be loaded directly on the card's processor 128, or may be stored in card's memory means 104 as exemplified in FIG. 1C. Memory means 104 includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like, or read and write memory, such as a hard drive, floppy disc, CD-RW, DVD-RW, solid state memory, such as solid state hard drives, flash cards, memory chips, and the like, and random access memory. Computer executable instructions 130 may be any type of computer executable instructions 130, which may be in the form of a computer program, the program being composed in any suitable programming language or source code, such as C++, C, JAVA, JavaScript, HTML, XML, and other programming languages. In one embodiment, the at least one memory means 104 may comprise of both hardware and software components.

In some embodiments, the mail card 100 does not include a processor 128 but instead includes a magnetic stripe 138 on the mail card's exterior 108 that is encoded with card identification information 102, card information 140, payment information 132 and the like. Accordingly, during a mailing transaction for example, when the mail card 100 is swiped through a card reader 142 that is issued by the post office, the postage application software program 134 retrieves the information stored on the magnetic stripe 138 that may include for example the cardholder's identification information 102 to generate addressee label information and/or link the mail being mailed to the cardholder for tracking purposes and extract payment information 132 for consummating the payment transaction. In some embodiments, additional information being verified for the payment transaction includes but is not limited to: validity of the mail card number 122, card's expiration date 152, any stored photographs of the cardholder with the actual person, or with any visible photographic images in the coded frame 106, and the like.

Memory means 104 may include any one or more of the following stored thereon: card identification information 102, and/or any other data structures 200 (as shown in FIG. 2), media content 118, hyperlinks 112, 112', website addresses or Uniform Resource Locators (URLs), and the like. In some embodiments, at least one memory means 104 may be embedded within at least one processor 128 where the information stored therein is encrypted for privacy purposes. In other embodiments, the at least one memory means 104 is adapted with electrical contacts, for establishing wired and/or wireless connectivity with external devices, e.g. a card reader 142 via for example the card's at least one microprocessor 128 where the memory means 104 is embedded within.

In some embodiments, mail card 100 may optionally include a battery 146, which serves as a power source for the at least one processor 128 positioned therein. In some embodiment, mail card 100 is adapted with external electrical contacts for establishing wired and/or wireless connectivity to a card reader 142 or a charger, e.g. a docking station, and as such may not include a battery 146. In that event, processor 128 detects when the mail card 100 has been disconnected from an external power source and switches mail card's power source to an internal power source, such as the battery 146.

Referring back to FIG. 1A, mail card 100 may include a card number 122, which acts as a unique identifier for the mail card 100 and/or cardholder. Card number 122 may be assigned by a random number generating program, comprising of numerals, characters, alphanumeric characters or any other unique identifiers that are known and used in the arts. Prior to being issued to the cardholder, the card number 122 may be recorded by the issuing postal service 120 as another means of identifying the cardholder. Mail card 100 may also include other indicia of identification, e.g. the cardholder's name 126. In some embodiments, the cardholder's address 134 may be stored within the mail card's memory means 104. In some embodiments, the cardholder's address 138 may be stored within the mail card's memory means 104. In some embodiments, mail card 100 may include a validation date, i.e. an issue date 148 (not shown) that may correspond to the date the mail card 100 was issued to a new resident in a community, and/or an expiration date 150, which corresponds to the date the mail card 100 expires and is no longer valid. In some embodiments, mail card 100 does not include an expiration date 150 as the mail card 100 may easily be invalidated when the resident moves from that area code.

FIG. 2 illustrates, by way of example, collectively the data structures 200 stored within the mail card 100 according to an embodiment of the invention. Data structures 200 are retained within the electronic data card's memory means 104, which preferably provides sufficient processing resources to facilitate communication and maintain adequate security for the card 100. Data structures 200 include but are not limited to: card number 122, security parameters 202, cardholder's identification information 102, payment information 132 for recording and making payment for the mail, cardholder's contact information 124, cardholder's postal address 127 (billing or mail delivery address) card information (expiration date 150, etc.) and the like. Card number 122 may act as a unique identifier allowing the system to uniquely recognize and register each mail card 100 that has been assigned and issued to individual cardholders. Card number 122 may be stored within the mail card's memory means 104 and may also be located on the card's exterior 108.

Security parameters 202 may be provided, that may include an encrypted key(s) of military grade, and or security codes, biometric security features, and/or other security mechanisms for maintaining the confidentiality of the data structures 200 stored on the card 100. Card information 102 may be stored thereon, and it will be understood that access to the card identification information 102 may be provided in a hierarchical form associated with security provisions to protect the confidentiality of the information stored on the mail card 100.

Systems & Methods

FIGS. 3A-3D are exemplary embodiments of the system 300 of the invention. System 300 comprises of an electronic mail card 100 with cardholder's information 102 electronically stored thereon and including a coded frame 106, displayed on the electronic mail card's exterior 108, which includes at least one or more hot corners 110, 110', 110" with at least one or more hyperlinks 112, 112', 112" or icons 114, 114', 114" embedded within the coded frame 106, activated for display when image capturing means 116 scans the coded frame 106 and upon activation, one or more hyperlinks 112, 112', 112" or icons 114, 114', 114" may be engaged for controlling media content 118 pursuant to a control command 302 associated with the one or more hyperlinks 112, 112', 112" or icons 114, 114', 114" in the at least one hot corner 110.

System 300 further comprises biometric verification means 304 positioned on a card reader 142, configured for receiving at least one biometric sample 306 from the cardholder for validation with the at least one biometric identifier 308 stored thereon; and the card reader 142 in electronic communication with a computer processor 128, wherein the card reader 142 is configured for activating the electronic mail card 100 upon validation of the at least one biometric sample 306, and upon activation, the electronic mail card 100 releases the at least one cardholder's information 102 stored thereon to the card reader 142, which receives the at least one cardholder's information 102 for generating addressee information 310 for a mailing label 312, and payment information 132 for charging for postage.

The system's card reader 142 is connected to a computer 314 and may include a postage application program 134 for communicating with the postal service 120. In some embodiments the postage application program 134 is stored on the card reader 142, while in other embodiments, the card reader 142 is in electronic communication (wired or wireless) with a computer 314 that controls the card reader 142 and communicates with the postal service's computer server 314'. In either embodiment, the card reader 142 is configured for scanning and reading the mail card 100, for verifying the cardholder's identity, generating addressee information 310 for mailing labels 312 and payment information 132 for postage.

Card reader 142 describes an electronic device for scanning and reading electronic data cards, e.g. the mail card 100, upon validation of the biometric sample 306 via the exemplary magnetic stripe 138, to obtain electronic data stored thereon as are well known and used in the arts. Card reader 142 is also configured for scanning and reading any one or more of the following: the mail card number 122, and/or any other component of the data structures 200 stored thereon. In some embodiments, card reader 142 is configured for reading or writing to the mail card 100.

Card reader 142 as exemplified herein may be adapted with electrical contacts for establishing wired and/or wireless connectivity to the mail card 100, and/or the computer 314 and transmits that mail card number 122 to the computer 314, where the mail card 100 is authenticated as a validly issued mail card 100. In some embodiments, a wireless connection may be established, wherein communication access is established with the computer 314 or the mail card 100 in response to validation of a biometric sample 306 that is validated against the biometric identifier 308 stored on the card reader 142. Once the biometric sample 306 is validated the mail card 100 is activated and the card reader 142 may scan and read the information stored on the magnetic stripe 138. Card reader 142 may also be integrated within a computer 314 (e.g. with a slot for wired card connectivity), an external device (e.g., USB connection to a small housing), or be integrated into other devices. In one embodiment, for the mailing of a package, the card reader 142 may be used to read the mail card 100 as swiped, reading for example the cardholder's name 126 such that the mail can be linked to the cardholder's card 100 for tracking purposes or the addressee information 310 can be generated.

Figure 3A:
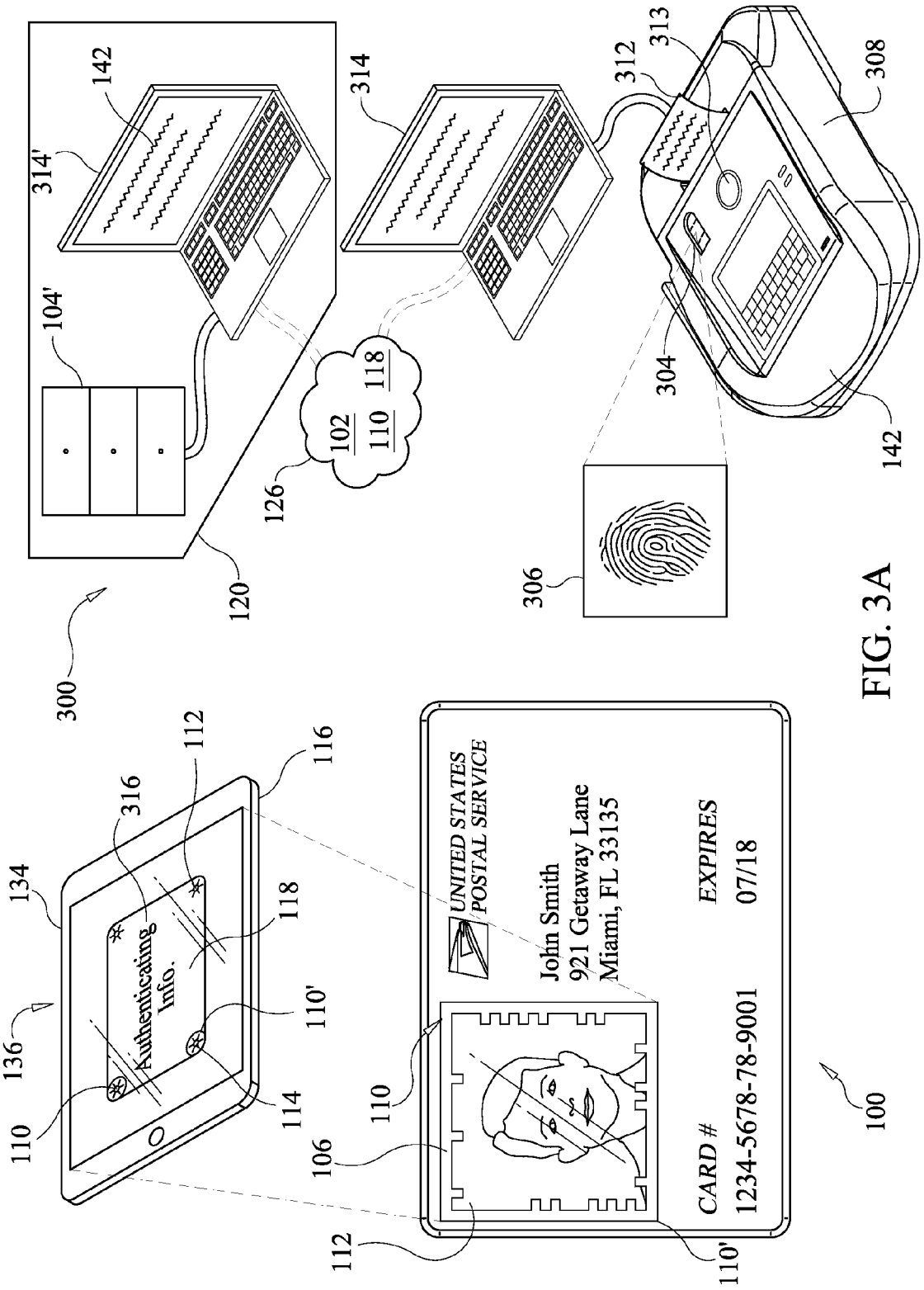
FIGS. 3A-3D are exemplary embodiments of the system of the invention.

As seen in FIG. 3A, the card reader 142 includes biometric verification means 304 positioned thereon, configured for validating a cardholder's biometric sample 306 by comparing the biometric sample 306 with the biometric identifier 308 stored thereon. Biometric verification means 304 includes but is not limited to: fingerprint recognition means, hand geometry recognition means, palm geometry recognition means, iris recognition means, retina recognition means, speech recognition means and any other biometric verification means 304 that are known and used in the arts. Biometric verification means 304 may include at least one processor 128 positioned within the mail card 100 and disposed in communication with, for example, a fingerprint scanner, hand geometry scanner, a palm geometry scanner, iris scanner, retina scanner, or a user interface, which may include an audio receiving circuit capable of receiving audio signals at predetermined frequencies and/or with additional hardware, complete with electronic circuitry and such other biometric verification means 304 that are known and used in the arts. Illustratively, as seen in FIG. 3A, the biometric verification means 304 includes a fingerprint scanner, where its processor 128 controls the functionality of the fingerprint scanner, generating the varied algorithms for storage of the first valid biometric sample 306 as a biometric identifier 308 and validates the images of subsequent biometric samples 306, 306' received from the cardholder.

In some embodiments, where the biometric sample 306 is invalid and fails to match the biometric identifier 308 stored thereon, the card reader's displaying means 316 may display a red light. Most likely, cardholder is given another opportunity(ies) to resubmit his/her biometric sample 306 as long as a predetermined limit for submitting biometric samples 306, 306' has not been exceeded to the extent such predetermined limit exists. If notwithstanding the opportunity to submit a valid biometric sample 306, cardholder's biometric sample 306 fails to match the biometric identifier 308 stored on the mail card 100 and the limit has been exceeded, the cardholder may have to report to the postal service 120 directly or follow their protocol for returning the card reader 142 as the card reader 142 will not be able to activate the mail card 100 for reading the information stored thereon.

Card reader 142, is connected to the postal services computer server 314 via network connections via a postal application program 134 and is configured for reading the mail card 100 for validating the identity of the cardholder preparing mail to be delivered to the postal service, accessing the postal services' computer 314 to register the mailing information, including sender's and delivery information, reading payment information 132 stored on the mail card 100 for making for example credit or debit payments, e.g. utility bills.

In some embodiments, card reader 142 may optionally include a battery 146', which serves as a power source for the card reader's at least one processor 128' positioned therein. In some embodiment, card reader 142 is adapted with electrical contacts for establishing wired and/or wireless connectivity to a or a charger, e.g. a docking station, and as such may not include a battery 146'. In that event, processor 128' detects when card reader 142 has been disconnected from an external power source and switches card reader's power source to an internal power source, such as the battery 308.

Upon issuance of the mail card 100 and prior to use, a biometric sample 306 is first obtained from the cardholder and/or all authorized users of the mail card 100 using the card reader's biometric verification means 304, where the biometric sample(s) 110, 110' are enrolled as biometric identifiers 102, 102' for authorized personnel, which may optionally be stored on the mail card 100, with the postal service agency or with a bank that supports the payment for future reference and comparison. In this manner, the card reader 142 may be shared by different persons within a company or household. Biometric identifier 308 as used herein describes a stored biometric sample 306 that uniquely identifies each authorized individual based on his/her intrinsic physical traits, e.g. fingerprints, retina scan, palm geometry, hand geometry, speech, and or other biometric identifiers 308, 308' that are used in the arts. Accordingly, in order to confirm the identity of the individual transmitting the certified or registered mail for making an online payment, or addressing any other postal needs that are normally used in the arts, the biometric sample 306 obtained via the card reader's biometric verification means 304 must match the biometric identifier(s) 308, 308 stored on the card reader 142 prior to the mail card 100 being activated in order to release the information stored on the mail card 100. Therefore, even if the mail card 100 is stolen it cannot be used with another (authorized or unauthorized) card reader 142 because a valid biometric sample 306 will be required to authenticate and activate the stolen mail card 100 with the non-corresponding card reader 142. Similarly, even if the mail card 100 and the corresponding card reader 142 are stolen together, because the mail card 100 must first be activated by the card reader 142 in order to release the information stored on the mail card 100, in the absence of the authorized individual's biometric sample 306 to first cause the card reader 142 to activate the mail card 100, the card reader 142 will not be able to read the information stored on the mail card 100, e.g. on the magnetic stripe 138. Thus, there is no incentive to steal the mail card 100 or the card reader 142 as the information retrieved by the card reader 142 from a stolen mail card 100 will create inaccurate addressee information 310 for mailing labels 312 and payment information 132 will not be incorrectly apportioned to the cardholder's account since the information remains with the unauthorized mail card 100.

Figure 3B:
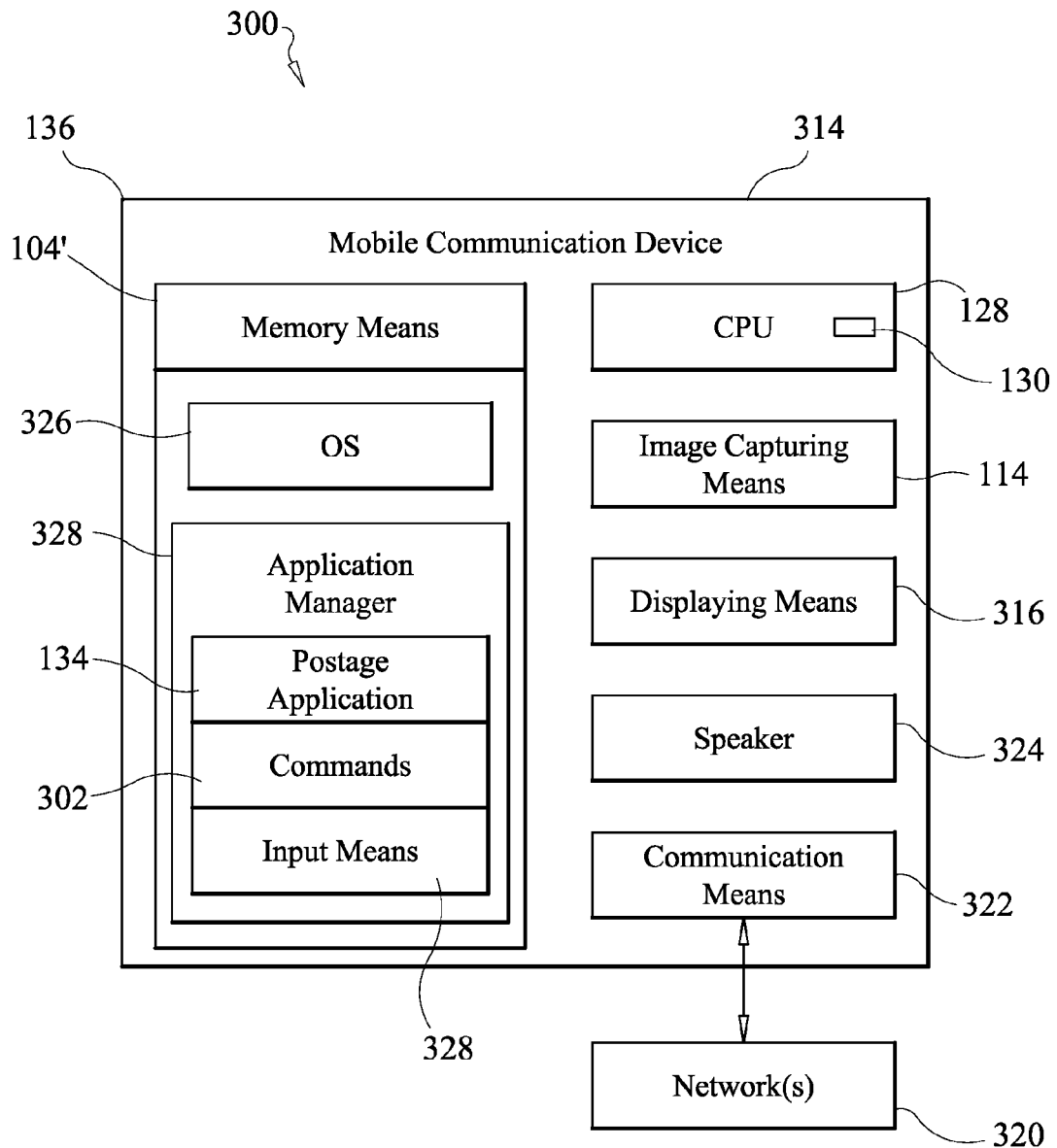
Figure 3C:
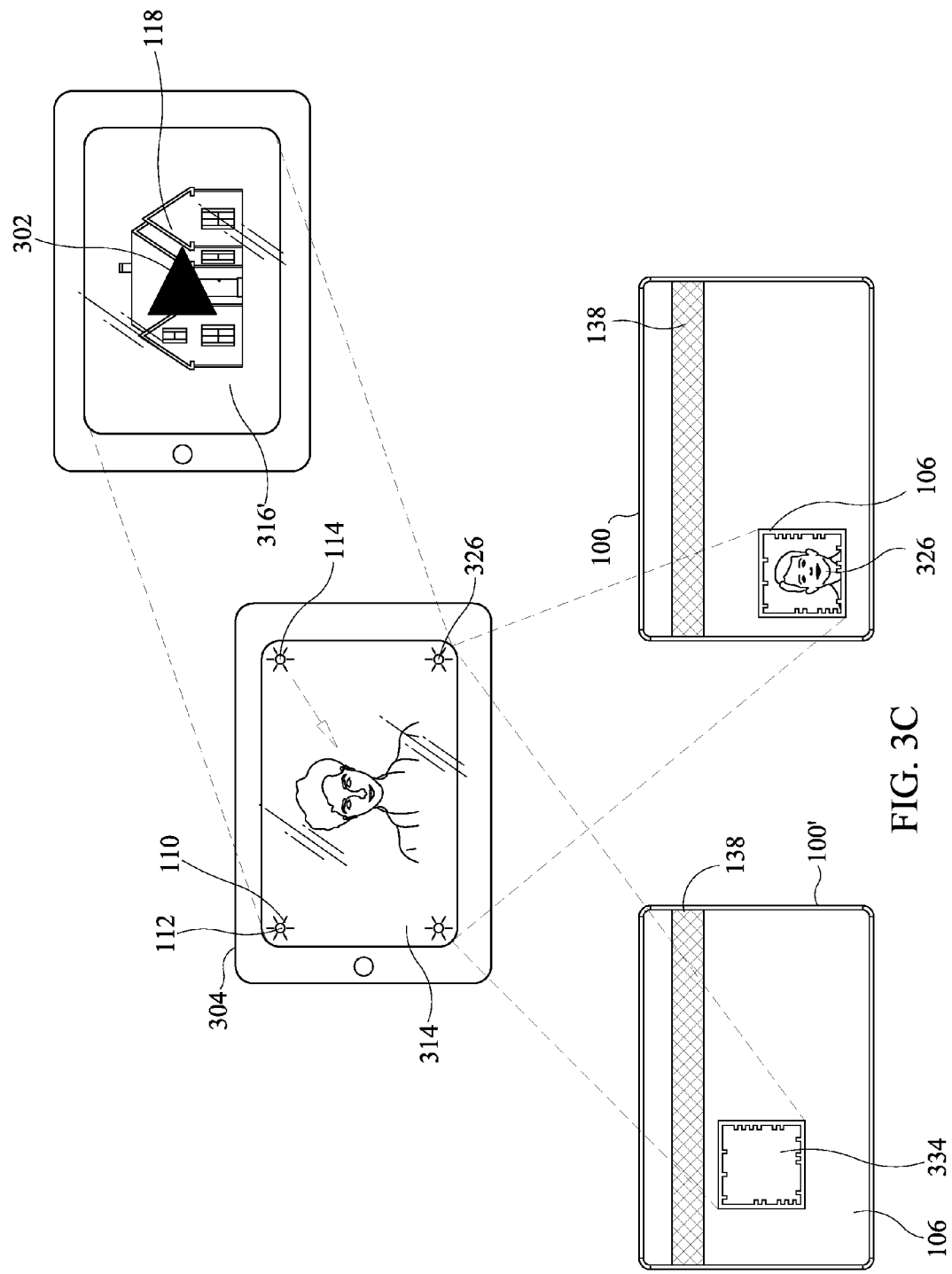
Figure 3D:
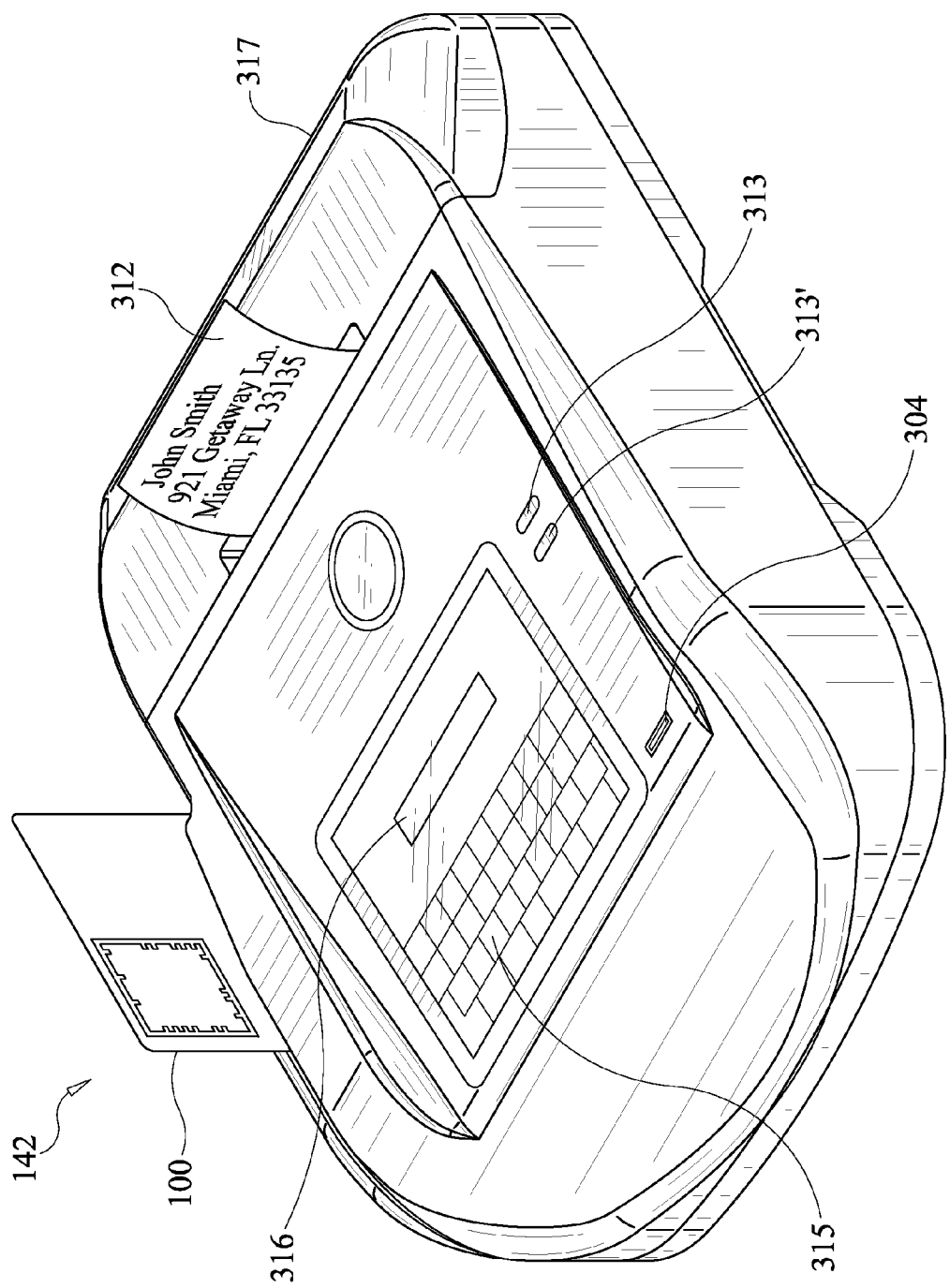

As shown in FIG. 3D, the card reader 142 includes LED indicator buttons 313, 313' that may be color coded, e.g. a red light may signal that the mail card 100 may be invalid or expired or the biometric sample 306 provided was invalid. A green or blue light on the LED indicator button 313 may confirm that the mail card 100 and/or the biometric sample 306 is valid and the cardholder may proceed with mailing activities. Card reader 142 may also include a digital keyboard 315 that may include QWERTY keys (virtual or actual keys) that may be used to input information to the postage application program 134. The keyboard 315 works in tandem with the displaying means 316 such that a card holder may for instance review password being entered for the card reader 142 or the information being typed thereon. Card reader 142 also includes an printer 317 incorporated therein (as are generally known and used in the arts for printing mailing labels, certified receipts, payment receipts and the like.

System 300 further comprises of a network enabled communication device 136 as shown in FIG. 3B. Networked communication device 136 may be any type of electronic computerized communication device configured with means for communicating wirelessly and/or wired with other electronic computer devices, and includes but is not limited to, a computerized scanner, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network 320, local area network 320, wide area network 320, such as the Internet 320, or any other type of network device that may communicate over a network 320. Computer server 314 as used herein includes but is not limited to a network enabled computer 314, cellular phones like the networked communication device 136 described herein, a laptop or personal digital assistant subject to wired/wireless connectivity, and configured with a computer processor 128.

Networked communication device 136 may include various other hardware components, e.g. memory means 104', one or more communication means 322 and also software components like the postage application program 134. The networked communication device's central processor 128' may be programmed to activate the postage application program 134, e.g. running in background while the networked communication device 136 is powered on, for viewing media content 118, which may be displayed on the mobile device's displaying means 316' in for example graphics, pictorial, video, audio, animation, text format or any combination thereof.

In some embodiments, the postage application program 134 may have its own computer icon 114' or other visual indicator displayed on the networked communication device 136 for launching or providing access to the postage application program 134. When consumer selects the respective interactive postage application program's icon 114 (e.g. by touching a touchscreen, or selecting it using a pointing device, roller ball, arrow keys, or other controller), upon selection, the communication device's processor 128' launches the postage application program 134 and the processor 128' that is also electronically connected to the displaying means 316', controls the displaying means 316' to display the postage application program 134 as launched on the at least one mobile device's displaying means 316'. Once displayed the postage application program 134 is ready for use in scanning the coded frame 106 and/or the image 326 within the coded frame 106 on the mail card 100.

Networked communication device's one or more memory means 104' may be either electrically or mechanically connected to the at least one computer processor 128'. Information stored on the networked communication device's memory means 104' may be retrieved using its processor 128' and may be published via push notification on the mobile device's displaying means 316' or broadcasted over a speaker 324 using the type and configuration of speakers that are well known and used in the arts for mobile phones 318, 318'.

Networked communication device 136 is equipped with communication means 322, either electrically or mechanically connected to the central processor 128'. In the case of electronic connections, the electronic connections may be wired and/or wireless. In some embodiments, communication means 322 may be a wireless communication means 322, which employ short range wireless protocol, such as, but not limited to, a radio frequency transceiver, a radio frequency receiver, and/or a radio frequency transmitter for communicating over the Internet 320 to access for example the post office, other designated URLs and their corresponding media content 118 or other aspects of the postage application program 134. It is understood that each coded frame 106 is unique, even if the media content 118 is not.

In embodiments where the wireless communication means 322 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 322 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 322 is operative to transmit or receive electronic communications, i.e. the captured at least one image 326, the coded frame 106, the media content 118, electronic data, audio, videos, text, pictures, graphics and the like via a short range wireless protocol, such as, but not limited to, a radio frequency receiver, a radio frequency transmitter, or a radio frequency transceiver and to communicate and search for the appropriate hyperlinks 112, 112', websites, URLs and the like over the Internet 320.

Networked communication device 136 includes a computer processor 128', disposed within and in electronic communication with the memory means 104'. Computer processor 128' includes computer executable instructions 130' readable and executable by the at least one processor 128'. Computer executable instructions 130' may be loaded directly on the mobile device's processor 128', or may be stored in mobile device's memory means 104', that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 130' are operative to perform all the necessary functions for the networked communication device 136, including but not limited to: launching the postage application program 134, i.e. running in background service while the networked communication device 136 is powered on, and controlling media content 118 corresponding to the coded frame 106 or at least one image 326 within the coded frame 106, which include at least one or more hot corners 110, 110', 110" with at least one or more embedded hyperlinks 112, 112' or icons 114, 114' within, and the like, or providing mail delivery status and/or updates to cardholder and/or providing for two-way communications with the postal service 120.

In some embodiments, the two-way communications may be effectuated by linking to the postal service's website and information can be inputted to the website, while in other embodiments, the postage application program 134 receives the input information and transmits the inputted information via the network communication device's communication means 322 to the postal service 120.

Networked communication device 136 may include any kind of displaying means 316', such as, but not limited to: a liquid crystal display ("LCD") screen, a light emitting diode ("LED") display, touchpad or touch screen display, and/or any other means known in the arts for emitting a visually perceptible output. Networked communication device's processor 128' is in electronic communication with its displaying means 316'. In other embodiments, displaying means 316' is wirelessly connected to processor 128'. Displaying means 316' may include input means 328, such as, but not limited to, a touch screen, a stylus, and the like that may be used to also control or input communications, e.g. send text messages, forwarded recorded videos, audio and the like to the postal service 120 or interact with the media content 118, e.g. identification verification questions. In some embodiments, displaying means 316' may be electronically connected to a networked communication device 136 according to the hardware and software protocols that are known and used in the arts. Computer central processor 128 controls the mobile device's displaying means 316', which is configured for displaying the media content 118 and the like.

Networked communication device 136 also includes software components that may be stored in the memory means 104". Memory means 104" may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by networked communication device 136. Networked communication device 136 may also contain an input element for inputting data and an output element for displaying data as well as controlling the media content 118.

Also stored on the memory means 104' may be an operating system 330, application manager 332, and the postage application program 134. Postage application program 134 may be an independent component or may be incorporated into the operating system 330. Postage application program 134 is a computer-executable component, readable and executable by the computer processor 128', wherein the postage application program 134 links to the Internet 320 to retrieve at least one or more media content 118 to be displayed on the mobile device's displaying means 316'. The media content 118 may be in any format, e.g. audio, video, pictorial, text message, graphics, and as such is published or also broadcasted in any format to the networked communication device 136.

Application manager 332 comprises of computer-executable components that operate in the networked communication device 136 and may be implemented in a variety of ways. In one embodiment of the invention, application manager 332 may use one or more computer-executable components for interacting with postage application program 134. In another embodiment, postage application program 134 is incorporated in application manager 332 to receive information from the input means 328, to communicate with, and/or to control the operations of postage application program 134.

Postage application program 134 may comprise in part of a browser, such as for use on the networked communication device 136, or a similar browsing device. Postage application program 134 may be any type of software application, such as a standalone application designed to run on a mobile platform, such as a mobile device running an operating system 330, such as iOS™, Android™, Windows Mobile™, Blackberry™, and the like. Postage application program 134 may be operative for an iPhone, any other "smart phone," mobile device, cellular phone, PDA, GPS or any other networked communication device 136 capable of handling electronic transactions dealing with dynamic content, object, application, or software. In some embodiments, the postage application program 134 may be designed to run on a social network platform, such as FACEBOOK® or JUSTSYNC®, TWITTER® and the like. In some embodiments, postage application program 134 may reside on a server computer 314 and may be downloadable from the server computer 314, the server computer's electronic database or otherwise reside in the networked communication device's local memory means 104'. For example, in one embodiment, the postage application program 134 may be on a networked communication device 136 (such as an iPhone, Blackberry, or other "smart phone") and the full-sized software program may be on a computer 314, where communications may occur over a network 320 or directly, either wired or wirelessly.

Referring back to FIGS. 3A & 3C, the networked communication device 136 may be used to scan the coded frame 106 and/or any image 326 within the coded frame 106 on the mail card 100. It is understood that the coded frame 106 may be any shape, e.g. a square, rectangle, octagon, a circle, teardrop, a blob, and the like. Cardholder may use image capturing means 116, e.g. a mobile device's camera, to scan or hover over the coded frame 106 and/or any image 326 activating the hidden, embedded at least one hyperlink 112 or icon 114. Once the coded frame 106 and/or the image 326 is scanned the at least one or more hot corners 110, 110', 110" with the at least one hyperlink 112 or icon 114 are activated and viewable to be engaged for controlling the interactive media content 118 pursuant to a control command 302 associated with the at least one icon 114 or hyperlink 112 in the at least one hot corner 108. In some embodiments, the control commands 302, 302' also become viewable and are displayed when the hot corners 110, 110', 110", hyperlinks 112, 112' or icons 114, 114' are activated. The activated at least one or more hot corners 110, 110', 110", hyperlinks 112, 112' or icons 114, 114' may pulsate, blink or displayed in a color contrast or animated to alert the consumer of the option to interact with the hot corners 110, 110', 110", hyperlinks 112, 112' or icons 114, 114' by exploring one or more of the interactive control commands 302, 302' associated with the icons 112, 112'. It is understood that the hot corners 110, 110', 110", hyperlinks 112, 112' or icons 114, 114' may be any shape(s), e.g. a square, rectangle, octagon, a circle, teardrop, a blob, a fish, and the like.

The icons 114, 114' or hyperlinks 112, 112' may be engaged on the networked communication device's displaying means 316' by overlaying the image 326 or designated display area 334 (if there is no image 326) within the coded frame 106 with at least one icon 114, which causes the postage application program 134 to retrieve the media content 118 for display. The interactive media content 118 may be stored on the mail card's memory means 104, the computer server's 146' or linked to a website or other URL, where the media content 118 may remain dynamic. Media content 118 includes cardholder's information 122 such that if the mail card 100 is a fake, since the cardholder's information 122 that may be stored thereon is coded and only viewable when scanned by image capturing means 116. Exemplary cardholder's information 122 may include but is not limited to cardholder's photograph 306, authenticating security questions, that may comprise of a randomly generated sequence based on the cardholder's known information, whereby the questions being posed are dynamic and may differ every time.

In some embodiments, once the networked communication device's image capturing means 116 hovers over the coded frame 106, it causes the postal application program 142 to automatically display the media content 118, that may include for example one or more stored videos, etc. that are associated with the coded frame 106 or link to the postal service 120 via a graphical user interface that allows the cardholder to engage in two-way communications and/or provide instructions to the postal service 120, e.g. "HOLD MAIL FOR TEN DAYS" or "RE-ROUTE MAIL TO ALTERNATE ADDRESS ON FILE". In some embodiments of the invention, the postage application program 142 includes virtual radio buttons 336, 336 (not shown) that may allow the consumer to further manipulate the captured image 326 or media content 118, e.g. play, rewind, fast forward, scroll text, or stop the video 118 being played. As such, the postage application program 142 makes a determination of whether a corresponding media content 118 exists: conducts at least one electronic computerized search for the corresponding media content 118 to the extent that the media content 118 exists; retrieves the media content 118 for the coded frame 106 and/or the image 326; and display the media content 118 on the mobile device's displaying means 316'.

Cardholder may use a network enabled communication device 136, e.g. a mobile phone, with image capturing means 116 to access and track the delivery status of the package. Cardholder may scan at his/her leisure the coded frame 106 (or the coded frame 106 with the image 326) on his/her mail card 100 to determine the mail delivery status of the package, e.g. sorted, at sorting facility, on the delivery truck, attempted delivery, delivered, returned to post office, and the like. Upon scanning the coded frame 106, the hot corners 110, 110' with the embedded hyperlinks 112, 112' or icons 114, 114' are activated and are now visible for engagement of the media content 118 that is automatically retrieved by the postage application program 142. In some instances, the postal service 120 may require completion of an identification validation process by posing security question(s) for the cardholder to answer. In that manner, cardholder may use another individual's communication device 136 but not automatically gain access to the mail delivery status for someone's else's mail. It is understood that the security question(s) would involve answers known only by the cardholder and/or a chosen few, but not a stranger. Once the cardholder answers the question, the postage application program 134 communicates the response to the networked communication device's processor 128 that controls the communication means for transmitting the response to the security questions instantly in realtime, so that the response can be immediately confirmed. If the answer is correct, access to the mail delivery status will be allowed and in some instances if incorrect, the cardholder may have another opportunity to provide a correct answer. According to the system and methods of the invention, alternate questions posed may differ from the previous question(s) asked. If the cardholder still answers incorrectly, the mail card 100 may be canceled or suspended immediately as a potential fraudulent card inquiry.

System's mail card 102 includes a coded frame 106 displayed on the card's exterior 108 that includes at least one hot corner 110 with at least one hyperlink 112 or icon 114 embedded within the coded frame 106, activated for display when image capturing means 116 scans the coded frame 106 and upon activation, the at least one hyperlink 112 or icon 114 is activated and may be engaged for controlling media content 118 and two-way communications between cardholder and one or more postal service 120.

Methods

Figure 4:
FIG. 4 is an exemplary method according to one embodiment of the invention.

FIG. 4 shows an example of an exemplary method 400 according to one embodiment. Method 400 comprises of receiving at least one biometric sample 306 from a cardholder for validation via biometric verification means 304 positioned on a card reader 142, which has at least one biometric identifier 308 electronically stored thereon (step 402). Method 400 further comprises validating the at least one biometric sample 306 (step 404) by comparing and matching the one biometric sample 306 with the one or more biometric identifiers 308, 308' electronically stored on the card reader 142. In some embodiments there may be a plurality of users of the same card reader 142, but nonetheless the biometric sample 306 for an authorized user of the mail card 100 must match the biometric identifier 308 electronically stored on the card reader 142.

Method 400 further comprises activating an electronic mail card 100 upon validation of the at least one biometric sample 306 by the card reader 142 that is in electronic communication with a computer processor 128, where the mail card 100 has cardholder's information electronically stored thereon and comprises a coded frame 104 displayed on the electronic mail card's exterior 108, which includes at least one or more hot corners 110, 110' with at least one or more hyperlinks 112, 112' or icons 114, 114' embedded within the coded frame 104, activated for display when image capturing means 116 scans the coded frame 106 and upon activation, the at least one or more hot corners 110, 110' with at least one or more hyperlinks 112, 112' or icons 114, 114' may be engaged for controlling media content 118 pursuant to a control command 302 associated with the at least one or more hyperlinks 112, 112' or icons 114, 114' in the at least one or more hot corners 110, 110' (step 406).

Method 400 further comprises releasing the at least one cardholder's information stored thereon to the card reader 142 upon activation of the mail card 100, where upon activation the card reader 142 receives the at least one cardholder's information 102 (step 408), payment information 132 or any other element of the data structures 200 stored thereon. Method further comprises generating addressee information 310 for a mailing label 312, and payment information 132 for charging for postage (step 410).

Figure 5:
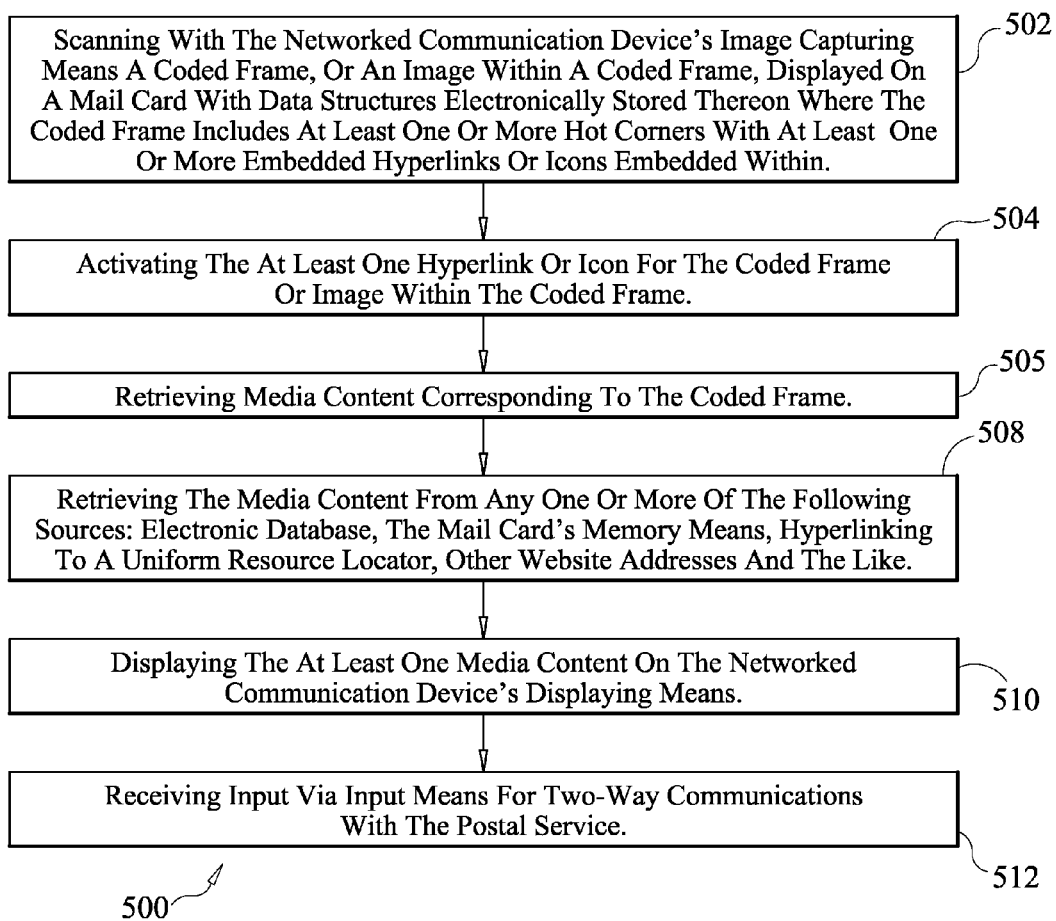
FIG. 5 is an exemplary method according to one embodiment of the invention.

FIG. 5 shows an example of an exemplary method 500 according to one embodiment. Method 500 comprises of scanning with the networked communication device's image capturing means 116 a coded frame 106, or an image 326 within a coded frame 106, displayed on an mail card 100 with data structures 200 electronically stored thereon where the coded frame 106 includes at least one or more hot corners 110, 110', 110" with at least one or more embedded hyperlinks 112, 112' or icons 114, 114' embedded within (step 502).

Method 500 further comprises activating for display the at least one hyperlink 112 or icon 114 for the coded frame 106 or image 326 within the coded frame 106 (step 504), where once it is activated the at least one or more embedded hyperlinks 112, 112' or icons 114, 114' become visible and are displayed on the displaying means 316'. Method 500 further comprises retrieving media content 118 corresponding to the coded frame 106 (step 506), where the postage application program 134 retrieves the media content 118 from any one or more of the following sources: electronic database 326, the mail card's memory means 104, hyperlinking to a Uniform Resource Locator, other website addresses and the like for displaying the at least one media content 118 on the networked communication device's displaying means 316 (step 508). Once the media content 118 is retrieved, cardholder may interact with the media content 118 and even engage in two-communications. Accordingly method 500 comprises receiving input via input means 328 for two-way communications with the postal service 120 (step 510).

Cardholder may engage the at least one hyperlink 112 or icon 114 for further interaction by overlaying a display area 324 if the coded frame 106 does not include an image 326 with the at least one hyperlink 112 or icon 114 or overlaying the image 326 within the coded frame 106 with the at least one hyperlink 112 or icon 114. By overlaying the display area 324 or the image 326 with the at least one icon 114, the icon and the hyperlink 112 are activated and may pulsate, blink or displayed in a color contrast or animated format to alert the consumer of the option to interact further with the hot corners 110, 110', 110" and/or the icons 112, 112' by exploring one or more of the interactive control commands 130, 130' associated with the icons 112, 112' or hyperlinks 112, 112'.

In some embodiments, method 500 comprises controlling the media content 118 pursuant to a control command 302 associated with the at least one icon 114 or hyperlink 112 in the at least one hot corner 108 that was activated by overlaying the image 326 or the designated area 316, which may include displaying the at least one media content 118 on the networked communication device's displaying means 316'. Once the media content 118 is displayed on the networked communication device's displaying means 316', the cardholder's identity may be authenticated based on the media content 118 as displayed on the networked communication device. For instance the media content 118 may include security questions or a photograph that may be used to verify the cardholder's identity. The media content 118 may be displayed within the coded frame 106 or in some embodiments is not confined to the coded frame 106 as it is displayed on the displaying means 316'. In either event, the media content 118 may be controlled with full functionality for review and control using the control command 302 associated with the at least one embedded icon 114 or hyperlink 112 that has been activated and includes any one of the following: display media content 118, display postage or mailing instructions, display public service announcement and the like. Control command 302 for displaying the at least one media content include but are not limited to any one or more of the following: play, stop, fast-forward, scroll text, rewind, pause, maximize viewing, minimize, end and cancel.

Hardware and Operating Environment

This section provides an overview of example hardware and the operating environments in conjunction with which embodiments of the inventive subject matter can be implemented. A software program may be launched from a computer readable medium in computer-based systems 100-300 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 6:
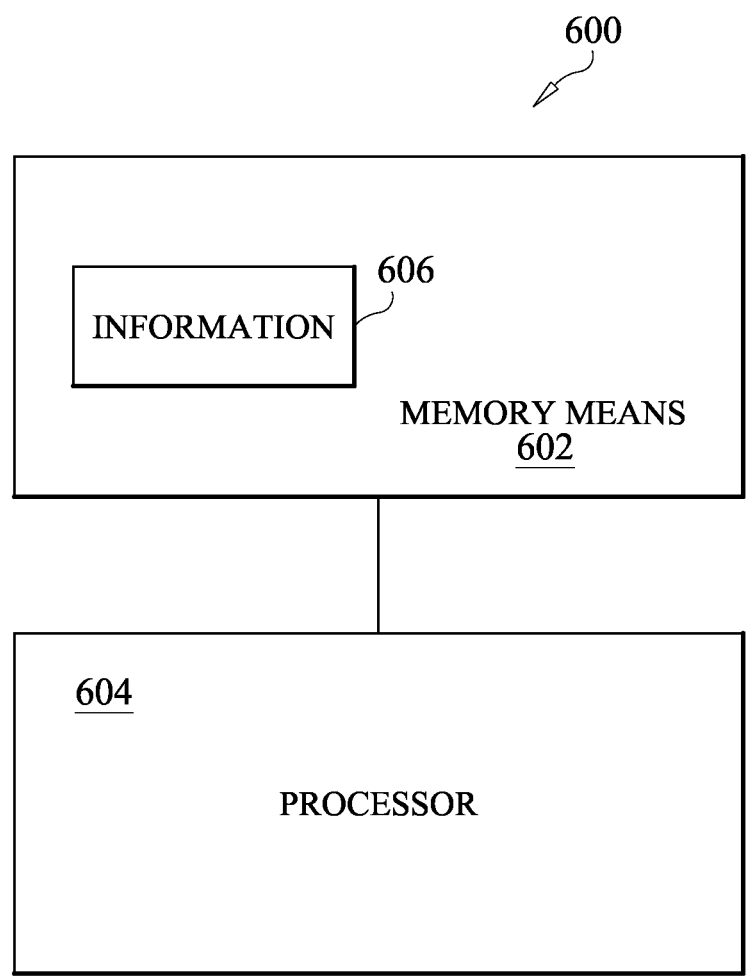
FIG. 6 is a block diagram representing an apparatus according to various embodiments.

FIG. 6 is a block diagram representing an apparatus 600 according to various embodiments. Such embodiments may comprise a computer, a memory system, a magnetic or optical disk, some other storage device, or any type of electronic device or system. The apparatus 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 604) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   (a) an electronic mail card with cardholder's information electronically stored thereon and including a coded frame, displayed on the electronic mail card's exterior, which includes at least one hot corner with at least one hyperlink or icon embedded within the coded frame, activated for display when image capturing means scans the coded frame and upon activation, the at least one hyperlink or icon may be engaged for controlling media content pursuant to a control command associated with the at least one icon or hyperlink in the at least one hot corner;

(b) biometric verification means positioned on a card reader, configured for receiving at least one biometric sample from the cardholder for validation with the at least one biometric identifier stored thereon; and (c) the card reader in electronic communication with a computer processor, wherein the card reader is configured for activating the electronic mail card upon validation of the at least one biometric sample, and upon activation, the electronic mail card releases the at least one cardholder's information stored thereon to the card reader, which receives the at least one cardholder's information for generating addressee information for a mailing label, and payment information for charging for postage.

2. The system of claim 1, wherein the biometric verification means includes but is not limited to: fingerprint recognition means, hand geometry recognition means, palm geometry recognition means, iris recognition means, retina recognition means, speech recognition means.

3. The system of claim 1, further comprising a networked communication device that comprises:
(a) a computer processor that includes computer executable instructions executable by the computer processor and configured for launching a postage application program, programmed for controlling the media content;
  (i) the image capturing means;
  (ii) displaying means for displaying the at least one media content; and
  (iii) input means for providing input for two-way communications with the postal service.

4. The system of claim 1, further comprising a card reader for reading the identification information from the mail card for providing mail status updates to the cardholder.

5. The system of claim 4, wherein data structures includes but are not limited to: card number, security parameters, and cardholder's identification information.

6. The system of claim 5, wherein the interactive postal application is further configured for retrieving the at least one media content by linking to a website via its web address where cardholder may do any one of the following: verify mail delivery status; search postage costs; issue instructions for redirecting mail delivery; manage a mailbox; provide the post office with instructions concerning his/her mail.

7. The system of claim 1, wherein the card reader includes memory means that may include any one or more of the following stored thereon: at least one biometric sample, at least one biometric identifier, identification information, customer account number, or other data structures.

8. The system of claim 7, wherein payment information comprises customer account number, available balance and bank information.

9. The system of claim 1, wherein the at least one media content includes any one or more of the following: videos, audio, text, graphics, cardholder's identification verification information, payment information, photographs, public service announcements, questions, games, promotions, coupons, coupon codes, bar codes, discounts, pricing, availability, advertisement, movies, and movie trailers.

10. The system of claim 1, wherein the interactive postage application is further configured for publishing mail status updates in realtime.

11. The system of claim 1, wherein the interactive postage application is further configured for facilitating communications of an alert to the postal service.

12. The system of claim 1, wherein the interactive postage application is further configured for publicizing a public service announcement to a plurality of other card holders within a certain radius.

13. The system of claim 1, wherein the interactive postal application is further configured for displaying the at least one media content with full functionality for review and control.

14. The system of claim 1, wherein the at least one control command for displaying the at least one media content includes but is not limited to any one or more of the following: play, stop, fast-forward, rewind, pause, maximize viewing, minimize, end and cancel.

15. A method comprising:
(a) receiving at least one biometric sample from a cardholder for validation via biometric verification means positioned on a card reader, which has at least one biometric identifier electronically stored thereon;
(b) validating the at least one biometric sample;
(c) activating an electronic mail card upon validation of the at least one biometric sample by the card reader that is in electronic communication with a computer processor, where the mail card has cardholder's information electronically stored thereon and comprises a coded frame displayed on the electronic mail card's exterior, which includes at least one hot corner with at least one hyperlink or icon embedded within the coded frame, activated for display when image capturing means scans the coded frame and upon activation, the at least one hyperlink or icon may be engaged for controlling media content pursuant to a control command associated with the at least one icon or hyperlink in the at least one hot corner;
(d) releasing the at least one cardholder's information stored thereon to the card reader upon activation, which receives the at least one cardholder's information; and
(e) generating addressee information for a mailing label, and payment information for charging for postage.

16. The method of claim 15, wherein the biometric verification means includes but is not limited to: fingerprint recognition means, hand geometry recognition means, palm geometry recognition means, iris recognition means, retina recognition means, speech recognition means.

17. The method of claim 15, further comprising: a networked communication device that comprises:
(a) scanning with image capturing means a coded frame or a coded image within a coded frame displayed on a mail card with identification information electronically stored thereon where the coded frame includes at least one hot corner with at least one hyperlink or icon embedded within;
(b) activating for display the activated at least one hyperlink or icon for the coded frame or a coded image within the coded frame;
(c) displaying the at least one media content on the networked communication device's displaying means; and
(d) receiving input via input means for two-way communications with the postal service.

18. The method of claim 15, further comprising reading the data structures from the mail card for providing mail status updates to the cardholder.

19. The method of claim 15, wherein the card reader includes memory means that may include any one or more of the following stored thereon: at least one biometric sample, at least one biometric identifier, identification information, customer account number, or other data structures.

20. The system of claim 19, wherein data structures includes but are not limited to: card number, security parameters, and cardholder's identification information.

21. The method of claim 15, wherein the at least one media content includes any one or more of the following: videos, audio, text, graphics, cardholder's identification verification information, payment information, photographs, public service announcements, questions, games, promotions, coupons, coupon codes, bar codes, discounts, pricing, availability, advertisement, movies, and movie trailers.

22. The system of claim 21, wherein payment information comprises customer account number, available balance and bank information.

23. The method of claim 15, further comprising publishing mail status updates in realtime.

24. The method of claim 15, further comprising facilitating communications of an alert to the postal service.

25. The method of claim 15, further comprising publicizing a public service announcement to a plurality of other card holders within a certain radius.

26. The method of claim 15, further comprising displaying the at least one media content with full functionality for review and control.

27. The method of claim 15, wherein the at least one control command for displaying the at least one media content includes but is not limited to any one or more of the following: play, stop, fast-forward, rewind, pause, maximize viewing, minimize, end and cancel.

28. The system of claim 27, wherein the interactive postal application is further configured for retrieving the at least one media content by linking to a website via its web address where cardholder may do any one of the following: verify mail delivery status; search postage costs; issue instructions for redirecting mail delivery; manage a mailbox; provide the post office with instructions concerning his/her mail.

* * * * *